2,923,681

DRILLING FLUIDS AND COMPOSITIONS FOR USE IN MODIFICATION OF SAME

Kenneth L. Hein and David L. Lindsey, Greybull, Wyo.

No Drawing. Application April 23, 1954
Serial No. 425,318

6 Claims. (Cl. 252—8.5)

This invention relates to a fluid composition for use in drilling oil, gas, water and other wells, and it relates more particularly to a fluid of the type described which is used with rotary drilling tools having a bit attached to the lower end of a hollow drill pipe or casing which is rotated for purposes of drilling out the bore hole.

In the use of a rotary drilling tool of the type described, a mud-laden fluid, hereinafter referred to as the drilling fluid, is circulated downwardly through the casing to the bit and it issues from the bit and rises through the annular space between the casing and the walls of the bore hole to the surface where the drilling fluid is treated to settle out certain of the contaminants and drillings. The drilling fluid serves a number of very useful purposes. For example, it functions to lubricate and to cool the drill bit so as to increase its useful life and the length of time that it may be allowed to remain in continuous service and it is intended to serve as a carrier for the cuttings made by the bit in drilling the bore hole.

It should supply sufficient hydrostatic pressure to the formation to counterbalance any pressures of liquids or gases which are encountered in the various strata through which the drill bit passes so as to minimize infiltration and it should also function to plaster the wall of the bore hole with as thin a layer as possible of a relatively impervious material to limit the flow of fluid into or out of the formation to a minimum amount.

In order for the drilling fluid to supply these functions, it should embody the following characteristics. The fluid should have a viscosity of such magnitude that it will be capable of fluid flow to enable the material to be pumped without excessive pressure differential for passage downwardly through the bore of the drill pipe and upwardly through the annular space between the drill pipe and the walls of the bore hole. While the fluid should be capable of free fluid flow, it should also be sufficiently thixotropic so that cuttings carried by the fluid will remain suspended in the fluid within the bore hole in the event that circulation should be stopped for any reason. Otherwise, the cuttings would tend to settle out and bridge over in portions of the bore hole thus requiring that portion to be rebored before the drill pipe can be reinserted for use. While the fluid should be capable of sufficient thixotropic effect, it should also permit particles rapidly to settle out from the suspension upon agitation in the settling tank. The fluid must be capable of adjustment such as to reduce its specific gravity as by the addition of oils, so that the hydrostatic pressure can be reduced to minimize filtration or to increase its specific gravity, as by the addition of compounds of heavy metals as a suspension, so that a pressure substantially greater may be applied to the formation when necessary to counterbalance conditions encountered in the drilling operation.

One of the physical characteristics of particular importance in a drilling fluid of the type described is its ability to form a thin impervious filter cake on the walls or on the face of the bore hole so as to seal the surface against the flow of fluids therethrough either inwardly from the formation or outwardly into the formation. It is desirable to have this filter cake form by plastering the walls of the bore hole as quickly as possible independent of the composition of the formation through which the drill is passing and without effect of the materials of the formation on the other physical properties of the fluid, such as its fluidity, thixotropic effect, cooling characteristics, settling characteristics and the like. When determined by the standard procedure for filtration rate, in accordance with the "Recommended Practice on Field Procedure for Drilling Fluids," A.P.I. code No. 29, second edition, published 1942, conventional drilling fluids provide for a filtration rate which is usually greater than 15 milliliters, depending upon the formation through which the drill is passing.

It is important further to make use of a drilling fluid which forms a thin impervious layer on the wall of the bore hole because otherwise the annular space between the casing and the wall becomes too confined and interferes with the flow of fluids upwardly through the hole and further increases the pressure necessary to force fluid through. This adds to the pressure head and the power requirements for the drilling operation.

Wall thickness is of significant importance in the use of core drills where the bit maintains the maximum dimension of the bore hole. When walls or filter cakes of excessive thickness form on the walls of the bore hole it becomes difficult to remove the bit from the hole for the many various purposes often required. Loss of the bit is undesirable from the standpoint of cost and operation. In addition, filter cakes of the type formed with fluids heretofore employed having undesirable thicknesses interfere with the removal of the drill bit and stem by a fishing operation after the stem has become twisted off. In the attempt to fish the stem and the drill bit out of the hole, the filter cake is often displaced and falls down to conceal the end of the stem so that the fish will be unable to gain access thereto for removal. It often becomes necessary to flush the hole out or remove the mud over the end of the stem to permit fishing the tool from the hole.

It is an object of this invention to produce and to provide a method for producing a drilling fluid which embodies the characteristics of the type described. More specifically, it is an object of this invention to produce a drilling fluid composition which may be added to conventional drilling muds, such as water and clay compositions, to impart the desired viscosity characteristics for fluid flow to enable circulation by pumping such as is ordinarily employed during drilling operations; which is sufficiently thixotropic to maintain the cuttings and other contaminants in suspension in the bore hole without settling out but which readily releases the cuttings and other contaminants for separation in the settling tank; which does not become unfit for use because of the presence of the cuttings and some of the contaminants in the fluid; which plasters a wall on the surface of the bore hole almost immediately upon being formed and which retains the wall without sloughing off over extended periods of continued use; which reduces the filtration rate through the walls of the bore hole to a very low level in the region of less than 10 milliliters and usually between 4–7 milliliters independent of the formation or the composition of the materials through which the bit is passing; which forms a mud cake on the walls of the bore hole which is markedly less in cross-section than the walls formed by conventional compositions, such as, for example, in the range of 1/32 to 2/32 as compared to wall thicknesses of 5/32 to 7/32 formed by conventional compositions; which does not require constant addition of materials for make-up once the fluid is formulated to contain a predetermined proportion of ingredients per unit volume of fluid; which makes use of a low pH in the fluid composition which is believed instrumental in the production of a tough filter cake and prevents sloughing off; which eliminates the necessity to add such materials as casein or carboxymethyl cellulose and the like, as in conventional practice, during passage of the bit through a salt region or through the Embar Lime; which permits greater lubrication and flow of the cement introduced for lining the walls of the bore hole to the extent that the amount introduced through the drill stem runs up to a much higher level than has heretofore been possible in the drilling of bore holes with conventional fluids; which lubricates the core in core drilling so that cores of more uniform dimension and cross-section are secured, and which produces a clean hole in a more efficient and economical manner.

In the past, use has been made of drilling fluids composed of water containing colloidal clays, such as bentonite, montmorillonite, and the like, suspended therein alone or in combination with barytes, hematite, metal powders or dusts or other water insoluble salts of heavy metals as a weighting agent to increase the specific gravity of the drilling fluid, or hydrocarbon oils or crude oils containing an agent for emulsification as a means for reducing the specific gravity of the fluid. This mud is circulated down through the hollow stem upon which the drill bit is mounted. It emerges from the end of the stem or casing and cools the bit and then rises up to the surface through the annular space between the drill stem or casing and the bore hole. In this basic type of composition, the viscosity can be varied to some extent by the ratio of bentonite in the fluid but it is adjusted more often by the addition of other materials as will hereinafter be described.

This simple clay and water mixture, with or without other agents for modifying specific gravity, is usually sufficient for use in drilling through the surface strata until the drilling bit enters into an anhydrite bed or gypsum rock or other contaminated formation. During the early stage of the drilling operation, the bentonite mud will deposit a filter cake on the walls of the bore hole which is relatively thick and water loss calculated at about 12 milliliters is secured. When the drill reaches an anhydrite bed or gypsum or other contaminated formation, unless the fluid is modified, the water loss rises very rapidly to about 40-50 milliliters and the filter cake that is formed becomes about ½ inch thick. In order to prevent this undesirable change in water loss and build-up in thickness of the filter cake and with the intention ultimately of reducing the thickness of the filter cake which has been formed without further increase in water loss, certain modifications are made to the drilling fluid preferably for a period in advance of entering into the anhydrite or gypsum.

In accordance with the practice of this invention, the fluid is treated to introduce a composition containing in combination a water soluble polyacrylate, tannic acid or quebracho and sodium carbonate or other salt of a strong base and a weak acid, all of which are combined in solution in advance of addition to the drilling fluid in amounts to introduce certain concentrations of the ingredients based upon the volume of fluid and independent of the formation being drilled. Modification in accordance with the practice of this invention is made solely on the basis of fluid supplied for use in drilling the bore hole, without additions or modifications, as in the past during drilling, thereby to provide for a permanent and stable composition which greatly simplifies and reduces the cost of the drilling operation and enables the well to be drilled more economically and efficiently as distinguished from the necessity of constant additions of stabilizing agents during drilling coupled with the necessity for adding other compounds, such as carboxymethyl cellulose, during passage of the drill through porous salt beds or the addition of other compounds to prevent thickening during passage through other formations.

To the present, use has been made of quebracho and soda ash, both alone and in combination, for reducing the viscosity of the drilling fluid, particularly when used with such thickening agents as an alginate as described in U.S. Patent No. 2,211,688, which describes the composition having particular application for use in drilling through porous salt beds and the like and wherein the alginate which is subject to deterioration by bacterial action is employed for the purpose of improving the plastering properties of the drilling fluid on the porous salt beds. In this composition, as in conventional compositions making use of sodium hydroxide, soda ash or other materials in combination with tannic acid or quebracho for viscosity control, the filter cake that forms on the walls of the bore hole often exceeds 5/32 of an inch and the water loss generally is greater than 12 milliliters. Addition of materials is constantly required to make up loss which occurs during drilling and additions of other materials are required to counteract solution of salts as the drill passes through various beds and for plastering the walls of the bore hole, such for example as the addition of carboxymethyl cellulose during passage through the Embar Lime.

Polyacrylates have been used both alone and in combination with soluble alkali metal salts as an agent to protect the fluid chiefly against viscosity change responsive to the solution of materials during passage through certain mineral layers which have previously caused deflocculation. As described in U.S. Patent No. 2,552,775, polyacrylates in amounts ranging from 0.2-5.0 percent by weight are introduced into the drilling fluid when used alone for viscosity control. When used in combination with the alkali metal salts, much larger amounts are required in the range of 0.5-5.0 percent by weight of the polyacrylates. In the composition of the above mentioned Patent No. 2,552,775, the presence of the polyacrylates is in conflict with the use which has heretofore been made of quebracho alone or in combination with sodium hydroxide or other base for pH adjustment and therefore such compositions have failed to make use of the combinations of polyacrylate, soda ash and quebracho as a material introduced into a drilling fluid to improve the characteristics thereof.

Aside from the differences in materials combined by the practice of this invention for the improvement of the drilling fluid, considerable differences reside in the ratio of ingredients present in the drilling fluid and in the manner in which these materials are incorporated into the drilling fluid, as will hereinafter be described.

By way of illustration, but not by way of limitation, the following represents a composition used in the practice of this invention:

*Example 1*

8 pounds of 12.5% by weight solution of sodium polyacrylate in water (Acrysol GS—Rohm & Hass Company)
1.5 pounds quebracho
5 pounds sodium carbonate These materials are first dissolved together in water to form a reddish brown solution for addition as a solution in the amounts described per barrel of drilling fluid. Addition of the stabilizing composition is made on the basis of the weights set forth above per barrel of fluid used in the drilling of a well and the amount of stabilizing composition in solution is introduced as the capacity of the bore hole is increased during drilling to provide for the desired concentration of materials per gallon of fluid. Thus the amount of material of Example 1 increases only as the total amount of drilling fluid is increased upon lengthening of the bore hole as distinguished from the constant addition of such agents as quebracho and sodium hydroxide or other base in amounts ranging from 100 pounds and 50 pounds of caustic per eight hour day in a system containing 500–700 barrels of fluid and which has originally been adjusted by the addition of 3 pounds of quebracho and 2 pounds of caustic per barrel.

The amount of material added originally to the drilling fluid plus the amount added as the volume of fluid is increased during drilling is sufficient, without further addition, to maintain the desired viscosity of the fluid without loss of thixotropic effect regardless of the salts dissolved into the fluid during formations and the cuttings retained within the fluid. The drilling fluid containing the combination of materials described causes a tough filter cake to be formed almost immediately on the walls of the bore hole and in which the thickness of the wall seldom exceeds 2/32 of an inch but is usually in the range of about 1/32 of an inch as compared to wall thicknesses which are seldom less than 5/32 of an inch formed by drilling fluids which have heretofore been employed. This type of a tough, plastered impervious cake forms almost immediately on the walls of the bore hole independent of the formation through which the drill passes except for the encounter with a channel which requires special treatment for plugging, as distinguished from the constant modification of fluids which have heretofore been employed as by the addition of other solids and thickening agents depending upon the character of the formation being drilled.

Of even more importance is the reduction in water loss which results from the use of the fluid as modified with the combination of ingredients of Example 1. Almost immediately upon addition of the liquid composition to the drilling mud, the water loss through the wall of the bore hole falls to below 10 milliliters even in the most porous formations and it seldom exceeds 4–7 milliliters in the usual formations encountered in the drilling of a well independent of the formations through which the bore hole extends. The reduction in water loss without constant modification in compositions represents an important advance in the art because the drilling operation becomes more desirable, especially from the standpoint of economy and safety in operation and results.

With the composition of Example 1 added from solution in the described amounts per barrel of drilling fluid, the materials are present in the drilling fluid in a concentration of about 0.2 percent by weight of the polyacrylate, about 0.3 percent by weight of quebracho, and about 1.1 percent by weight of soda ash. The amount of sodium polyacrylate may be increased to 0.4 percent with slight reduction in water loss but beyond 0.4 percent, the slight reduction in water loss is more than offset by an undesirable increase in viscosity of the drilling fluid. Little, if any, benefit results from the use of less than 0.1 percent by weight of the polyacrylate. Best results are secured with a concentration of about 0.2–0.3 percent by weight of the polyacrylate in the drilling fluid.

Instead of sodium polyacrylate, use may be made of ammonium polyacrylate or other alkali metal salts of acrylic acid polymers preferably having a molecular weight greater than 5000. A suitable polyacrylate is supplied in 12.5 percent solids in aqueous medium by the Rohm & Haas Company of Philadelphia, Pennsylvania, under the trade name "Acrysol GS." Use may also be made of other water soluble polymeric resins, such for example as the water soluble resinous polymer manufactured by the Minnesota Mining & Manufacturing Company of Minneapolis, Minnesota, under the trade name "KH 27" having a solids content of about 18.5 percent. These materials may be formulated into the composition in the desired amounts in aqueous dispersion or solution or as solid materials. Though not equivalent, improvement in characteristics of the drilling fluid are also secured by the use in the described combination of other resinous materials such as rosins, gums and other relatively water soluble resins and gums.

The amount of quebracho which may be used in combination with the polyacrylate in the composition appears to be quite critical. When less than 0.2 percent by weight quebracho is present in the drilling fluid, excessive gelling occurs while more than 0.5 percent by weight quebracho reduces the gel strength of the drilling fluid to unworkable levels. Instead of quebracho, use may be made of tannic acid, other tannins or materials rich in tannin such as pistachio, sumac, osage, logwood, lignite, lignosulphate and kraft paper liquor, and the like materials.

The sodium carbonate represents one of the important ingredients in the composition. When used in combination with the polyacrylate or other water soluble resin and quebracho, the sodium carbonate is incorporated in amounts to adjust the pH of the drilling fluid to about 9 which is relatively low by comparison to a pH of 10–14 heretofore employed for adjusting viscosity and for reducing the wall thickness of the mud cake deposited on the walls of the bore hole before adjustment of the fluid. The amount of sodium carbonate cannot satisfactorily be increased beyond 2.0 percent by weight without undesirably increasing the water loss of the fluid. Amounts less than 0.7 percent by weight of the fluid cannot satisfactorily be used and successfully worked through the anhydrite bed. Under no circumstance could less than 0.3 percent by weight of soda ash be used successfully in a composition of the type described.

In the past it has been possible to make use of other strongly basic materials such as caustic soda to achieve viscosity control. In fact, it has been preferred to make use of caustic soda alone or in combination with quebracho and tannic acid for purposes of modifying the drilling fluid during passage to form the bore hole. Unlike such compositions which have been previously employed, sodium hydroxide and the like strongly basic materials cannot be used instead of soda ash in the practice of this invention because the addition of caustic soda causes thickening of the drilling fluid to such an extent as to make it incapable of being pumped and the fluid tends to set up almost immediately to a hard gel.

In practice, the composition of Example 1 is added to the drilling fluid shortly before the drill reaches the anhydrite bed, but it may be added to the drilling fluid from the very start. Until then, the drilling fluid is composed of bentonite or other colloidal clay in dispersion in water. The bentonite alone or with other clays and weighting agents functions to deposit a relatively thick filter cake in the order of 5/32 to 7/32 of an inch on the walls of the bore holes as they are being formed and the water loss is generally in the order of 12.

The bentonite and water fluid becomes useless unless the stabilizer is added before entering the anhydrite bed. In the event that the stabilizer is omitted, the water loss rises to over 50 and the wall thickness builds up to over ½ inch in the anhydrite area. If the stabilizer composition of Example 1 is added in the amounts described, the pH of the composition is adjusted to a relatively low valve of 9 which causes the bentonite to come off slowly from the filter cake formed on the walls of the bore hole without any sloughing off, leaving a tough filter cake of less than 2/32 of an inch in thickness lining the walls of the bore hole.

The addition of the composition of Example 1 from solution in aqueous medium which adjusts the pH of the fluid to about 9 causes the formation of a tough lining on the walls of the bore hole as distinguished from a poor filter cake which forms with the danger of shale sloughing off when use is made of a composition of the type heretofore employed having a pH higher than 10. During drilling through the anhydrite bed and through the usually underlying red bed, the water loss experienced with compositions containing 3 pounds of quebracho and 2 pounds of caustic per barrel of fluid coupled with the addition of 100 pounds of quebracho and 50 pounds of caustic after 8 hours of operation in an operation using 500–700 barrels of fluid provides for a water loss in the range of 15–20 as compared to the water loss of 4–7 which is secured during the same period of operation with compositions employing features of this invention and without the necessity for making up any of the stabilizing materials after the original addition.

Under the red bed, there is usually a productive zone called the Embar Lime which may have a few salt beds running through. Most operations require a low water loss of less than 10 during passage through this Embar region, otherwise oil will be forced back so that it becomes more difficult to bring in the well and to clean out the well. To reduce the water loss during operation through this formation, it has been the usual practice with most of the agents heretofore added to the drilling fluid to add carboxymethyl cellulose or its equivalent in amounts of about ¾ to 1 pound per barrel. This represents a rather substantial cost to the operation. With the drilling fluids formed in accordance with the practice of this invention, no additions of a similar character are required since the low water loss secured through the formations above continue to prevail during passage through the Embar region, regardless of the encounter with salt beds or with the solution of salts in the drilling fluid. Below the Embar Lime, there is usually a shale break of bentonite which, in the past, has caused difficulty before entrance into the Tensleep sand. However, as previously pointed out, such difficulties do not arise with the compositions of this invention so that drilling continuously without modification or addition becomes possible to provide for a more efficient and low cost drilling operation In addition to the uniformity in the development of a tough, thin filter cake on the walls of the bore hole without addition of materials or without further modification of the drilling fluid, considerable improvement results from the use of the drilling fluid, wherein a core is formed which enters into the shaft or casing. A core of more uniform cross-section is formed with enters more easily into the shaft to enable a more continuous operation and the development of a complete cross-section of the bore, without loss in efficiency of operation. In core drilling, using a diamond head drill, it is customary to remove the drill about every 100 feet or about every 24 hours for various purposes. With conventional fluids heretofore employed, considerable danger of the drill sticking in the bore hole existed because of the relatively thick filter cake formed above the drill on the walls of the bore hole. With the tough, thin wall formed with the present drilling fluid, the bit can be more easily withdrawn from the bore hole with markedly less danger of loss.

As previously pointed out, unexpected improvements are secured as a result of the use of the drilling fluid described when the bore hole is to be lined with cement. In lining, the fluid cement composition is introduced through the casing after the hole has been drilled for passage up through the bottom into the annular space between the casing and the walls of the bore hole. When the filter cake is formed with fluids embodying features of this invention, the cement slurry appears to be capable of greater flow to the extent that it naturally rises to a level which may be more than 100 feet above the level heretofore achieved with similar cement compositions in bore holes caked with products of other drilling fluids.

The foregoing represents but a few of the more important advantages secured by compositions embodying features of this invention. For further illustration, additional examples will be given of compositions which may be employed as a drilling fluid. In the following examples, the amount of materials will be given in weights per barrel of drilling fluid.

*Example 2*

4–15 pounds of an aqueous composition containing 12% sodium polyacrylate
1.5–3 pounds of tannic acid
2–6 pounds of sodium carbonate

*Example 3*

6 pounds of an aqueous composition containing 18.5% of a water soluble resin, KH–27 (Minnesota Mining & Manufacturing Company)
2 pounds of quebracho
5 pounds of sodium carbonate

*Example 4*

6 pounds of an aqueous composition containing 20% of a water soluble resinous polymer
1.5 pounds of tannic acid
5 pounds of potassium carbonate

*Example 5*

8 pounds of an aqueous composition containing 10–12% sodium polyacrylate
3 pounds of lignite
5 pounds of sodium carbonate

*Example 6*

1.5 pounds of rosin
1 pound of tannic acid
5 pounds of sodium carbonate

In the above examples the acrylic acid polymers may be incorporated in equivalent amounts as 100 percent solids or in various other concentrations in aqueous medium. The materials of the above examples which may also be supplied as a premix in dry powder form are first combined for solution in a small amount of water prior to the addition as a stabilizing composition in the desired amounts to the drilling mud. It appears that considerable importance resides in the procedure for combining the materials in aqueous medium before introduction into the drilling fluid. If the ingredients are added directly to the drilling fluid, the desired characteristics are incapable of being developed. In fact, the fluid appears to deteriorate by becoming somewhat stiff and relatively incapable of use. Instead, when the materials are first combined with a small amount of water independent of the drilling mud, and addition is made from this prepared aqueous composition, the characteristics described are developed in the drilling fluid and remain throughout its use in the drilling operation.

It appears further that the ingredients incorporated from solution in the aqueous medium become depleted from the drilling fluid only to the extent necessary to form the thin filter cake on the walls of the bore hole. Once the filter cake is formed, additional material necessary for the desired formation thereafter is not apparently extracted. As a result, make-up as heretofore required becomes unnecessary since the amount of the composition added to compensate for the great amount of fluid upon lengthening of the bore hole is sufficient to form the necessary cake on the wall as it is being formed. As a result, the concentration required in the drilling fluid may be calculated chiefly on the basis of the number of barrels capacity of the well.

To the best of our knowledge, no one before has made use of the combination of a soluble acrylic acid polymer, quebracho or tannic acid and soda ash in the formulation of a drilling fluid which embodies characteristics incapable of being secured with compositions that have heretofore been employed and which imparts improvements that remain continuous throughout the use of the fluid in drilling the well, independent of the formations through which the well is bored or the materials contained therein and independent of the physical characteristics of the formation being drilled. To the best of our knowledge no one before has succeeded in formulating a drilling fluid capable of such operation to enable drilling of a well in a simple and efficient manner with less difficulty in bringing in the well and with less hazards in the formations thereof.

It will be understood that variations may exist in the formations through which the well is bored depending upon the area for drilling and that modifications may be made in the specific materials and their formulation into a drilling fluid without departing from the spirit of the invention, especially as defined in the following claims.

We claim:

1. A composition for stabilization of a drilling mud calculated in amounts per barrel of mud, consisting essentially of .5–3 pounds of a water soluble polyacrylate resin, 1.5–3 pounds of a material selected from the group consisting of quebracho, tannic acid, tannins, vegetable extracts rich in tannin and lignite, 2–6 pounds of an alkali metal carbonate.

2. A composition for stabilization of a drilling mud calculated in amounts per barrel of mud, consisting essentially of .5–3 pounds of a water soluble acrylic acid polymer, 1.5–3 pounds of tannic acid, 2–6 pounds of sodium carbonate, and a small amount of water with which the materials are combined before addition to the drilling mud.

3. A composition for stabilization of a drilling mud calculated in amounts per barrel of mud, consisting essentially of .5–3 pounds of a water soluble acrylic acid polymer, 1.5–3 pounds of quebracho, 2–6 pounds of sodium carbonate, and a small amount of water with which the materials are combined before addition to the drilling mud.

4. In a drilling fluid formulated of colloidal clay in suspension in water, a stabilizing composition consisting essentially of a water soluble salt of an acrylic acid polymer present in amounts ranging from 0.1–0.4 percent by weight, a composition selected from the group consisting of tannic acid, quebracho, tannins, vegetable extracts rich in tannins and lignite present in amounts ranging from 0.2–0.5 percent by weight and a water soluble alkali metal carbonate, said fluid being adjusted to a pH of about 9.

5. In a drilling fluid formulated of colloidal clay in suspension in water, a stabilizing composition consisting essentially of a water soluble polyacrylate resin present in amounts ranging from 0.1–0.4 percent by weight, quebracho present in amounts ranging from 0.2–0.5 percent by weight, and an alkali metal carbonate present in amounts ranging from 0.3–2.0 percent by weight.

6. In a drilling fluid formulated of colloidal clay in suspension in water, a stabilizing composition consisting essentially of a water soluble polyacrylate resin present in amounts ranging from 0.1–0.4 percent by weight, a composition selected from the group consisting of tannic acid, quebracho, tannins, vegetable extracts rich in tannins and lignite, present in amounts ranging from 0.2–0.5 percent by weight, and sodium carbonate present in amounts ranging from 0.3–2.0 percent by weight.

References Cited in the file of this patent

UNITED STATES PATENTS

| | | |
|---|---|---|
| 2,343,113 | Jones | Feb. 29, 1944 |
| 2,552,775 | Fischer et al. | May 15, 1951 |
| 2,560,930 | Campise | July 17, 1951 |
| 2,718,497 | Oldham et al. | Sept. 20, 1955 |